United States Patent
Gley et al.

(10) Patent No.: US 6,539,408 B1
(45) Date of Patent: Mar. 25, 2003

(54) PRECONDITIONING OF SOURCE DATA FOR PACKED MIN/MAX INSTRUCTIONS

(75) Inventors: Michael A. Gley, Sacramento, CA (US); Sanjeev Jahagirdar, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/469,785

(22) Filed: Dec. 22, 1999

(51) Int. Cl.[7] .............................. G06F 15/00; G06F 7/50
(52) U.S. Cl. .......................................... 708/207; 708/671
(58) Field of Search .................. 708/207, 671; 340/146.2

(56) References Cited

U.S. PATENT DOCUMENTS

| | | | | |
|---|---|---|---|---|
| 5,515,306 A | * | 5/1996 | Blaner | 708/207 |
| 5,726,923 A | * | 3/1998 | Okumura et al. | 708/207 |
| 5,894,426 A | * | 4/1999 | Ju | 708/207 |
| 6,341,296 B1 | * | 1/2002 | Menon | 708/207 |

* cited by examiner

Primary Examiner—Tan V. Mai
(74) Attorney, Agent, or Firm—Kenyon & Kenyon

(57) ABSTRACT

Source data can be preconditioned to perform a packed min/max operation. A first selector can be coupled to a first invertor and a first input. A second selector can be coupled to a second invertor and a second input. An adder can be coupled to said first selector and said second selector. A third selector can be coupled to said adder, the first input, and the second input.

23 Claims, 3 Drawing Sheets

KNOWN ART

PRECONDITIONING OF SOURCE DATA FOR PACKED MIN/MAX INSTRUCTIONS

FIELD OF THE INVENTION

Embodiments of the present invention relate to preconditioning of source data for a packed min/max instructions of a processor.

BACKGROUND OF THE INVENTION

Known methods and apparatus can perform a minimum/maximum operation (a min/max operation), i.e., can compare a pair of source data and output either the source data that is the maximum of the pair of source data (a max operation) or the source data that is the minimum of the pair of source data (a min operation). FIG. 1 shows a known apparatus that can perform a known min/max operation on a pair of data, e.g., S2 and S1. An adder 101 and invertor 111 can subtract S1 from S2 when C1in is a logical one (e.g., adder 101 and invertor 111 perform twos-complement subtraction). The adder 101 outputs a carry, C1[15], that can indicate whether S2 is greater than S1. If S2 is less than S1, then C1[15] will be zero and multiplexer (mux) 106 will select S2 as the min output. If S1 is less than S2, then C1[15] will be one and mux 106 will select S1 as the min output.

A second set of logic circuits can be used to perform a max operation on S2 and S1, the second set of logic including adder 102, inverter 112, and mux 107. Adder 102 and invertor 112 can subtract S1 from S2 when C2in is a logical one (e.g., adder 102 and invertor 112 perform twos-complement subtraction). The adder 102 outputs a carry, C2[15], that can indicate whether S2 is greater than S1. If S2 is greater than S1, then C2[15] will be one and mux 107 will select S2 as the max output. If S1 is greater than S2, then C2[15] will be zero and mux 107 will select S1 as the max output.

One type of min/max operation is a Packed min/Packed max operation, which can be executed by a processor that executes SIMD (single instruction, multiple data) instructions. A SIMD instruction can include packed source data, e.g., eight bytes of source data, four words of source data, four signed words of source data, etc. A Packed min /Packed max (Pmin/Pmax) instruction can be executed by the processor to enhance video processing, audio processing, etc. Examples of uses of Pmin/Pmax operations include analyzing video pixel data (e.g., determining which pixel is darker, etc.) as part of morphing video images, overlaying video images, etc. Video pixel data can be encoded using signed word data (e.g., 16 bit data having a positive or negative value). Audio processing applications can also utilize Pmin/Pmax operations, such as analyzing audio data to determine differences in audio volumes. Audio data can be encoded using unsigned byte data (e.g., 8 bit data that is unsigned). Implementation of Pmin/Pmax operations in hardware can require additional hardware logic.

Known min/max operations can require two sets of logic circuits, including two adders. Additional logic can disadvantageously consume silicon area resources of a processor, an integrated circuit, etc. In view of the foregoing, it can be appreciated that a substantial need exists for methods and apparatus which can advantageously perform min/max operations.

SUMMARY OF THE INVENTION

Embodiments of the present invention include apparatus and methods to precondition source data for packed minimum/maximum operations. A first selector can be coupled to a first invertor and a first input, and a second selector can be coupled to a second invertor and a second input. An adder can be coupled to said first selector and said second selector. A third selector can be coupled to said adder, the first input, and the second input.

DETAILED DESCRIPTION

Embodiments of apparatus and methods to perform preconditioning of source data for packed min/max operations are described. In the following description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

Figure 1:
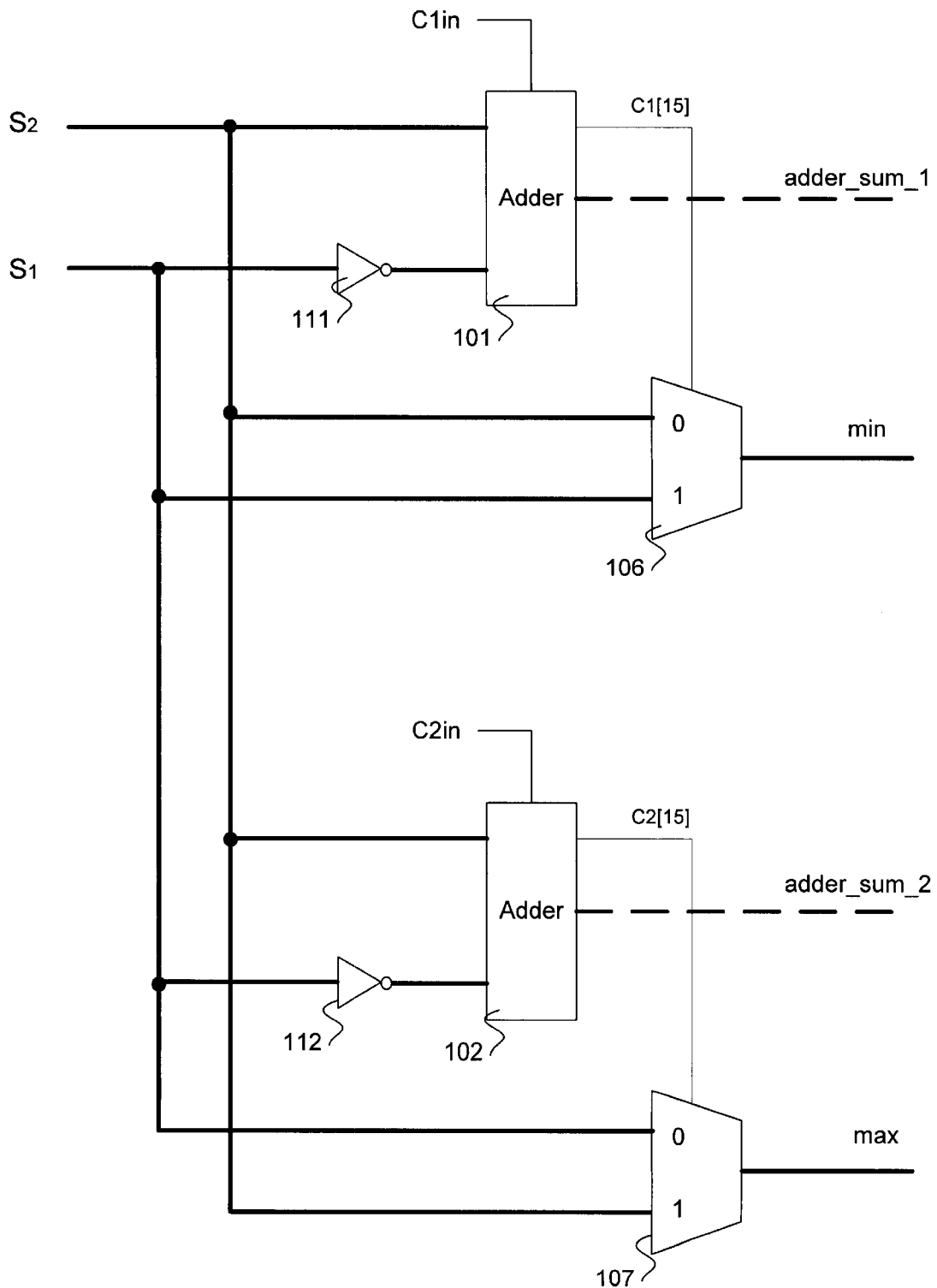
FIG. 1 shows a known apparatus that can perform a known min/max operation on a pair of data.
Figure 2:
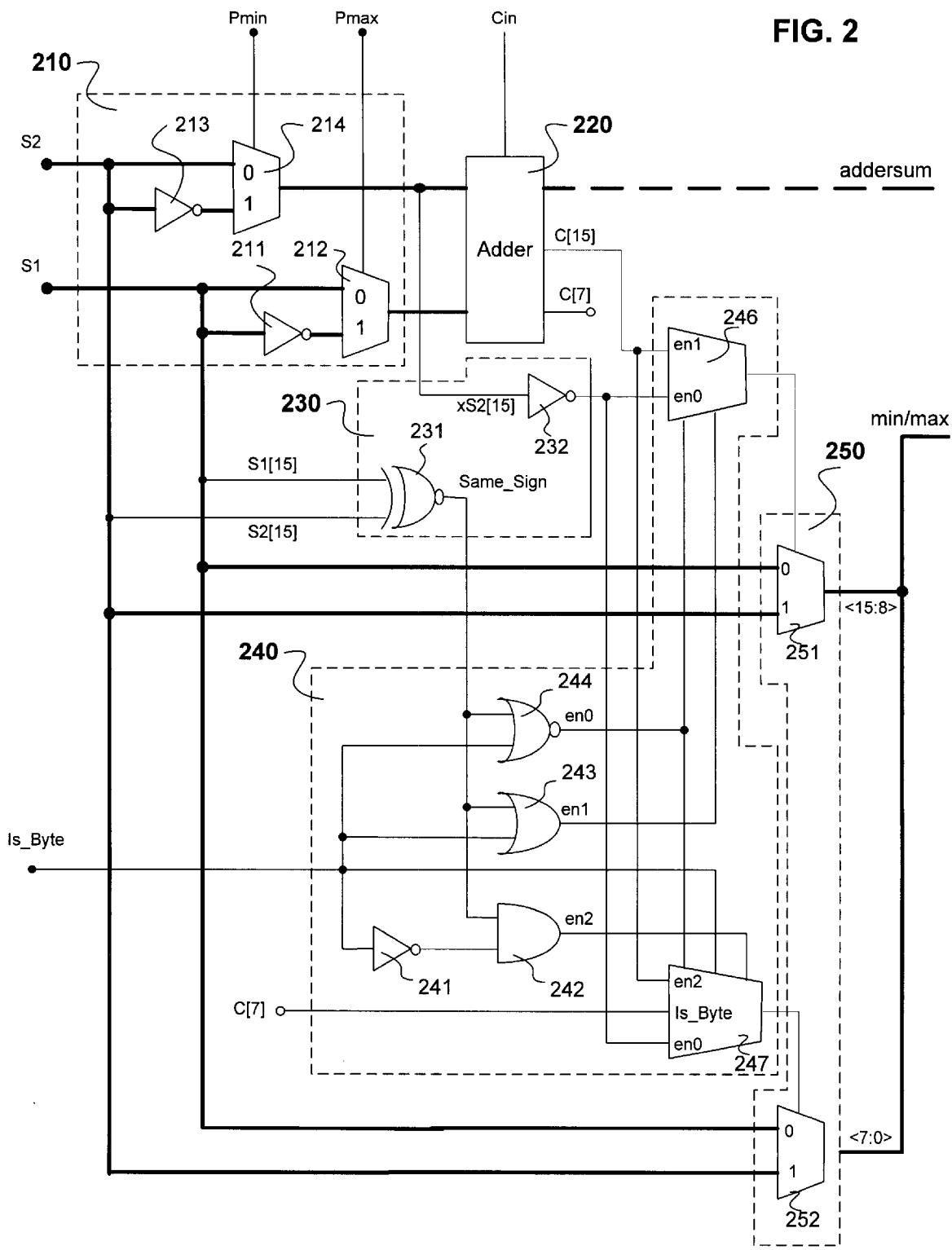
FIG. 2 shows an apparatus in accordance with an embodiment of the present invention.

FIG. 2 shows an apparatus in accordance with an embodiment of the present invention. In one embodiment of the invention, source data of a Pmin/Pmax operation are preconditioned as part of execution of the Pmin/Pmax operation. An apparatus to perform a Pmin/Pmax operation on either unsigned byte data or signed word data can include a data preconditioning circuit 210, an adder 220, a signed data circuit 230, a data selection control circuit 240, and a data selection circuit 250.

Data preconditioning circuit 210 can receive a first data S1 (e.g., a first source data operand of a SIMD instruction, a 16 bit data word, a 16 bit signed data word, a pair of 8 bit unsigned data bytes, etc.) and a second data S2. A first mux 212 of the data preconditioning circuit 210 can receive (i) the first data S1 from a first input and (ii) a complement of the first data S1 (e.g., a ones-complement, etc.) from an inverter 211. A second mux 214 can receive (i) the second data S2 from a second input and (ii) a complement of the second data S2 from an inverter 213. Each of first mux 212 and second mux 214 are examples of a selector than can output one of a plurality of inputs based one or more control and/or enable signals received by the selector.

First mux 212 can output one of first data S1 or complemented first data S1 to an adder 220 based upon a Pmax control indication (e.g., a Pmax control signal, a first adder input control signal, etc.). In one embodiment, first data S1 is output to adder 220 when Pmax is a logical zero (e.g., approximately zero volts, etc.), and complemented first data S1 is output to adder 220 when Pmax is a logical one (e.g., five volts, 3.3 volts, 2.5 volts, etc.). Second mux 214 can output one of second data S2 or complemented second data S2 to adder 220 based upon a Pmin control indication. In one embodiment, second data S2 is output to adder 220 when Pmin is a logical zero, and complemented second data S2 is output to adder 220 when Pmin is a logical one.

Data preconditioning circuit 210 and adder 220 can generate carry indications which in part can determine the result of a Pmin/Pmax operation. Signed data circuit 230, data selection control circuit 240, and data selection circuit 250 can support execution of Pmin/Pmax operations on unsigned byte and signed word data. Execution of a Pmin/Pmax operation on unsigned byte data is first described.

A data bit size indication (e.g., an "Is_Byte" control signal, etc.) can be received by data selection control circuit 240. In one embodiment, the data bit size indication is a logical one when each of first data S1 and second data S2 include a pair of unsigned byte data (e.g., each data include a first byte and a second byte), and the data bit size indication is a logical zero when each of first data S1 and second data S2 are signed word data. When the data bit size indication is a logical one (i.e., unsigned byte data mode), a first control mux 246 will select a first carry indication (e.g., the C[15] indication) to output to a first select mux 251 of the data selection circuit 250, and a second control mux 247 will select a second carry indication (e.g., the C[7] indication) to output to a second select mux 252 of the data selection circuit 250. First select mux 251 can output either the first byte of first data S1 or the first byte of second data S2 based on the first carry indication received from first control mux 246. Second select mux 252 can output either the second byte of first data S1 or the second byte of second data S2 based on the second carry indication received from second control mux 247.

First control mux 246 and second control mux 247 output the carry indications received from the adder 220 based in part on a plurality of enable signals generated by enabling logic of data selection control circuit 240. The enabling logic can include an inverter 241, an AND 242, an OR 243, and a NOR 244 to generate a first enable EN0, a second enable EN1, and a third enable EN2.

In one embodiment, first control mux 246 has first enable signal (EN0) and a second enable signal (EN1) as enable signal inputs. When the data bit size indication is a logical one (e.g., Is_Byte=1), then NOR 244 outputs EN0 as a logical zero and OR 243 outputs EN1 as a logical one. First control mux 246 thereby selects the first carry indication received from adder 220 (e.g., when EN0=0 and EN1=1), and the first select mux 251 receives the first carry indication (e.g., C[15]) as a first data selection control indication. Second control mux 247 has EN0, EN2, and the data bit size indication as enable signal inputs. When the data bit size indication is a logical one, then AND 242 outputs EN2 as a logical zero. Second control mux 246 thereby selects the second carry indication received from adder 220 (e.g., when EN0=0, Is_Byte=1, EN2=0), and the second select mux 252 receives the second carry indication (e.g., C[7]) as a second data selection control indication.

Based in part upon the carry indications received from the data selection control circuit 240, the data selection circuit 250 can select the appropriate bytes to output (e.g., the greater bytes of first data S1 and second data S2 during a Pmax operation, the lesser bytes of first data S1 and second data S2 during a Pmin operation, etc.). The following tables illustrate, with respect to one embodiment of the present invention, which data (e.g., which unsigned byte portion of first data S1 and second data S2, etc.) is output based on (i) the Pmax/Pmin operation to be performed and (ii) the carry indication generated.

Table One summarizes the logic of an embodiment of an apparatus that preconditions a first data S1 and a second data S2 prior to performing a Pmax/Pmin operation.

TABLE ONE

| Instruction | Subtraction | Carry | Result |
|---|---|---|---|
| Pmax(S2, S1) | S2 − S1 | 0 | S1 |
| Pmax(S2, S1) | S2 − S1 | 1 | S2 |
| Pmin(S2, S1) | S1 − S2 | 0 | S1 |
| Pmin(S2, S1) | S1 − S2 | 1 | S2 |

Table Two shows another view of the logic summarized in Table One.

TABLE TWO

| Pmax | Pmin | Carry | Result |
|---|---|---|---|
| S2 − S1 | −S2 + S1 | 0 | S1 |
| S2 − S1 | −S2 + S1 | 1 | S2 |

Table Two illustrates how carry information can be utilized to implement both Pmax and Pmin with a single adder when the source data (e.g., first data S1, second data S2, etc) is preconditioned in accordance with an embodiment of the present invention. Embodiments of the present inventions can thereby reduce the amount of space (e.g., silicon area resources) required in an integrated circuit to implement both Pmax and Pmin operations.

Having described preconditioning source data and execution of a Pmin/Pmax operation on unsigned byte data in accordance with an embodiment of the present invention, execution of a Pmin/Pmax operation on signed word data in accordance with an embodiment of the present invention is described.

When first data S1 and second data S2 each comprise signed word data, the data bit size indicator can have a logical value of zero and the enable signals EN0, EN1, and EN2 can be based in part on sign indications received from the signed data circuit 230. When performing a Pmin/Pmax operation on a pair of signed word data, there are two general situations: (i) a first data S1 and a second data S2 have different signs and (ii) the first data S1 and the second data S2 have the same sign.

When the first data S1 and the second data S2 have different signs, the Pmax/Pmin determination can be made based at least in part on the sign of one of the data and generation of a carry indication by the adder 220 is not required. For example, when the signs are different in a Pmax operation, the first data S1 is output when the first data S1 has a positive sign and the second data S2 is output when the first data S1 has a negative sign. Further, when the signs are different in a Pmin operation, the first data S1 is output when the first data S1 has a negative sign and the second data S2 is output when the first data S1 has a positive sign.

In accordance with one embodiment of the present invention, signed data circuit 230 can include an XNOR 231 that compares the sign bits of first data S1 and second data S2. When first data S1 and second data S2 have different signs, XNOR 231 can output a signed data indication (e.g., a "Same_Sign" signal, etc.) having a logical zero value. With the data bit size indicator also having a logical value of zero (indicating signed word data), NOR 244 outputs EN0 as a logical one, OR 243 outputs EN1 as a logical zero, and AND 242 outputs EN2 as a logical zero. When EN0 has a logical one value, each of first control mux 246 and second control mux 247 can output as the data selection control indications a signed selector indication received from the signed data circuit 230. In one embodiment, the signed selector indicator is generated by complementing (with inverter 232) the logical value of the sign bit of the data output by the second mux 214 of the preconditioning circuit 210 (e.g., the complement of the sign bit of the selected data of second data S2 and complemented second data S2).

For example, when a Pmax operation (e.g., Pmax=1, Pmin=0) is executed with a first data S1 having a negative value (e.g., with a sign bit of logical one) and a second data S2 having a positive value (e.g., with a sign bit of logical zero), second data S2 and complemented first data S1 are selected and output by the data preconditioning circuit 210. Signed data circuit 230 can output a signed selector indication having a value of logical one (i.e., the complement of the sign bit of the data output by second mux 214, which is second data S2 in this example). The signed selector indication is output by each of first control mux 246 and second control mux 247 as data selection control indications, which are received by first select mux 251 and second select mux 252. When the data selection control indications have a value of logical one (i.e., the complement of the logical value of the sign bit of second data S2), first select mux 251 outputs a first portion (e.g., the more significant bits 15:8) of second data S2 and second select mux 252 outputs a second portion (e.g., the less significant bits 7:0) of first data S2.

In another example, when a Pmin operation (e.g., Pmin=1, Pmax=0) is executed with a first data S1 having a negative value (e.g., with a sign bit of logical one) and a second data S2 having a positive value (e.g., with a sign bit of logical zero), complemented second data S2 and first data S1 are selected and output by the data preconditioning circuit 210. Signed data circuit 230 can output a signed selector indication having a value of logical zero (i.e., the complement of the sign bit of the data output by second mux 214, which is complemented second data S2 in this example). The signed selector indication is output by each of first control mux 246 and second control mux 247 as data selection control indications, which are received by first select mux 251 and second select mux 252. When the data selection control indications have a value of logical zero (i.e., the complement of the logical value of the sign bit of complemented second data S2), first select mux 251 outputs a first portion (e.g., the more significant bits 15:8) of first data S1 and second select mux 252 outputs a second portion (e.g., the less significant bits 7:0) of first data S1.

When the first data S1 and the second data S2 are each signed data words having the same sign (e.g., both are positive numbers with a logical zero as the sign bit, both are negative numbers with a logical one as the sign bit, etc.), the Pmax/Pmin determination can be made based at least in part on a first carry indication generated by the adder 220.

In accordance with one embodiment of the present invention, signed data circuit 230 can include XNOR 231 that compares the sign bits of first data S1 and second data S2. When first data S1 and second data S2 have the same sign, XNOR 231 can output a signed data indication (e.g., a "Same_Sign" signal, etc.) having a logical one value. With the data bit size indicator having a logical value of zero (indicating signed word data), NOR 244 outputs EN0 as a logical zero, OR 243 outputs EN1 as a logical one, and AND 242 outputs EN2 as a logical one. When EN1 has a logical one value, first control mux 246 can output the first carry indication as a first selection control indication to first select mux 251. When EN2 has a logical one value, second control mux 247 can also output the first carry indication as the second selection control indication to the second select mux 252. Thus, as summarized in Table One and Table Two, first select mux 251 and second select mux 252 collectively can output either first data S1 or second data S2 based on the first carry indication generated by adder 220.

Figure 3:
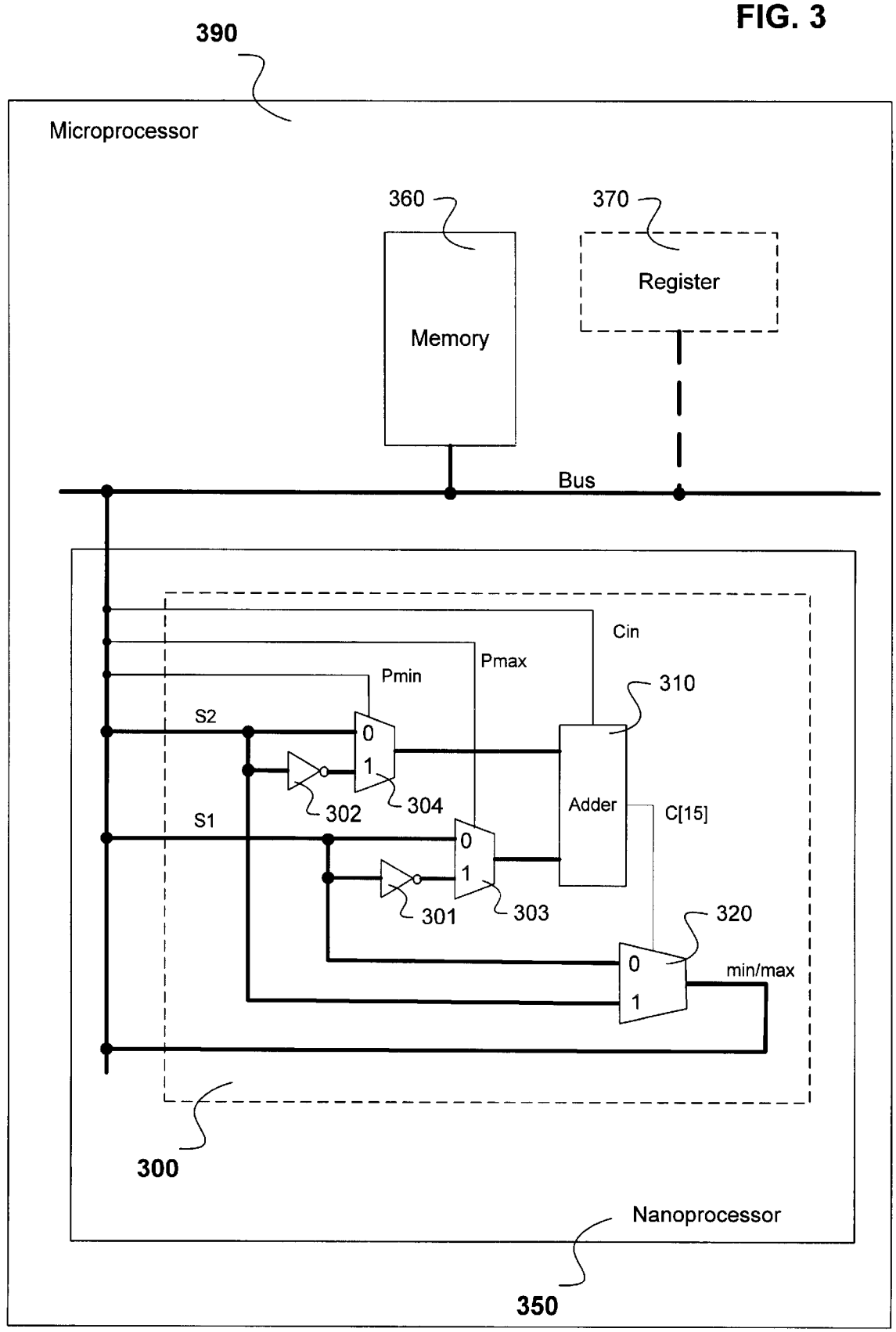
FIG. 3 shows a system in accordance with an embodiment of the present invention.

FIG. 3 shows a system in accordance with an embodiment of the present invention. A microprocessor 390 can include a nanoprocessor 350, a memory 360, and a register 370. Nanoprocessor 350 can execute a micro-operation based on source data received from memory 360 and/or register 370. The micro-operation result data can be stored in memory 360 and/or register 370. The micro-operation can be a Pmin operation and/or a Pmax operation, and nanoprocessor 350 can include a Pmin/Pmax circuit 300 to execute a Pmin operation and/or a Pmax operation.

In accordance with one embodiment of the present invention, Pmin/Pmax circuit 300 can receive a first data S1, a second data S2, a Pmin control indication, and a Pmax control indication. Pmin/Pmax circuit 300 can precondition each of first data S1 and second data S2. The preconditioning can include generating a complemented first data S1 and a complemented second data S2. A data pair can be selected to be input to adder 310 based on a first control indication (e.g., Pmin) and a second control indication (e.g., Pmax). For example, when Pmin has a logical zero value and Pmax has a logical one value, a Pmax operation can be executed by selecting a first data pair as input to adder 310. The first data pair can include the second data S2 (selected by mux 304) and a complemented first data S1 (complemented by inverter 301 and selected by mux 303). In another example, when Pmin has a logical one value and Pmax has a logical zero value, a Pmin operation can be executed by selecting a second data pair as input to adder 310. The second data pair can include a complemented second data S2 (complemented by inverter 302 and selected by mux 304) and first data S1 (selected by mux 303).

Adder 310 can generate a carry indication based on adding together each of the data of the selected data pair with a carry from Cin (e.g., perform twos complement subtraction of first data S1 from second data S2, perform twos complement subtraction of second data S2 from first data S1). The carry indication can be received by mux 320, which can output either first data S1 or second data S2 based on the carry indication. In accordance with one embodiment of the invention, and as summarized in Table One and Table Two, mux 320 can output either first data S1 or second data S2 based on the carry indication generated by adder 310.

In accordance with one embodiment of the present invention, instructions adapted to be executed by a processor to perform a method in accordance with an embodiment of the present invention are stored on a medium. The medium can be any device adapted to store digital information. The term "adapted to be executed" is meant to encompass instructions that are ready to be executed in their present form (e.g., machine code) by a processor, or require further manipulation (e.g., compilation, decryption, decoding, etc.) to be ready to be executed by a processor. In one embodiment of the present invention, the instructions adapted to be executed are microcode instructions.

Embodiments of the present invention advantageously allow execution of Pmin/Pmax operations. In one embodiment of the present invention, Pmin/Pmax operations can be executed without a separate adder for each of a Pmin and a Pmax operation. Pmin/Pmax operations can be performed on both unsigned byte data and signed word data with a reduced number of adder circuits.

In the foregoing detailed description, apparatus and methods in accordance with embodiments of the present invention have been described with reference to specific exemplary embodiments. Accordingly, the present specification and figures are to be regarded as illustrative rather than restrictive.

What is claimed is:

1. An apparatus to perform a minimum/maximum operation on a plurality of data, the plurality of data including a first data and a second data, the apparatus comprising:
   a first inverter and a second inverter, said first inverter coupled to a first input, said second inverter coupled to a second input;
   a first selector and a second selector, said first selector coupled to said first inverter and the first input, said second selector coupled to said second inverter and the second input;
   an adder, coupled to said first selector and said second selector; and
   a third selector, coupled to said adder, the first input, and the second input.

2. The apparatus of claim 1, wherein each of said first selector and said second selector is a multiplexer.

3. The apparatus of claim 1, wherein said first selector is coupled to a first control input and said second selector is coupled to a second control input.

4. The apparatus of claim 1, wherein the third selector is coupled to a minimum/maximum output.

5. The apparatus of claim 1, wherein the first selector and second selector are to collectively output one data pair of a first data pair and a second data pair, the first data pair including the first data and a complemented second data, the second data pair including a complemented first data and the second data.

6. The apparatus of claim 5, wherein said third selector is to output one of the first data and the second data based at least in part on a carry indication received from said adder.

7. The apparatus of claim 3, wherein:
   the third selector is coupled to a minimum/maximum output, and
   in response to a first pair of control indications received at the first control input and the second control input, the third selector is to output the lesser data of the first data and the second data.

8. The apparatus of claim 3, wherein:
   the third selector is coupled to a minimum/maximum output, and
   in response to a second pair of control indications received at the first control input and the second control input, the third selector is to output the greater data of the first data and the second data.

9. An apparatus to perform a dual-mode minimum/maximum operation on a plurality of data, the plurality of data including a first data and a second data, the apparatus comprising:
   a data preconditioning circuit, coupled to a first input and a second input;
   an adder, coupled to the data preconditioning circuit;
   a signed data circuit, coupled to the first input and the second input;
   a data selection control circuit, coupled to said adder and said signed data circuit; and
   a data selection circuit, coupled to said data selection control circuit, the first input, and the second input.

10. The apparatus of claim 8, wherein said data preconditioning circuit includes:
   a first inverter and a second inverter, said first inverter coupled to the first input, said second inverter coupled to the second input;
   a first multiplexer and a second multiplexer, said first multiplexer coupled to said first inverter and the first input, said second multiplexer coupled to said second inverter and the first input.

11. The apparatus of claim 9, wherein said data preconditioning circuit is to output one data pair of a first data pair and a second data pair, the first data pair including the first data and a complemented second data, the second data pair including a complemented first data and the second data.

12. The apparatus of claim 11, wherein:
   said signed data circuit includes an exclusive nor circuit and an inverter, said signed data circuit is to receive
      a first sign bit value of the first data,
      a second sign bit value of the second data item, and
      a third sign bit value of a data output by said data preconditioning circuit; and
   said data selection control circuit includes a first control multiplexer and a second control multiplexer, said data selection control circuit is to receive
      a first carry indication and a second carry indication from said adder,
      a signed data indication and a complemented third sign bit value from said signed data circuit, and
      a data bit size indication.

13. The apparatus of claim 12, wherein
   said data selection circuit includes a first selection multiplexer and a second selection multiplexer,
   said first selection multiplexer is coupled to a first portion of the first input and a first portion of the second input, said first selection multiplexer is to receive a first data selection control indication from said data selection control circuit,
   said second selection multiplexer is coupled to a second portion of the first input and a second portion of the second input, said second selection multiplexer is to receive a second data selection control indication from said data selection control circuit.

14. The apparatus of claim 13, wherein
   the data bit size indication is a byte indication;
   said first selection multiplexer is to output one of a first byte of the first data and a first byte of the second data based at least in part on the received first data selection control indication, the received first data selection control indication based at least in part on the first carry indication; and
   said second selection multiplexer is to output one of a second byte of the first data and a second byte of the second data based at least in part on the received second data selection control indication, the received second data selection control indication based at least in part on the second carry indication.

15. The apparatus of claim 13, wherein
   the data bit size indication is a word indication;
   the first sign bit value of the first data and the second sign bit value of the second data being the same,
   said first selection multiplexer is to output one of a first byte of the first data and a first byte of the second data based at least in part on the received first data selection control indication, the received first data selection control indication based at least in part on the first carry indication; and
   said second selection multiplexer is to output one of a second byte of the first data and a second byte of the second data based at least in part on the received second data selection control indication, the received second data selection control indication based at least in part on the first carry indication.

16. The apparatus of claim 13, wherein
the data bit size indication is a word indication;
the first sign bit value of the first data and the second sign bit value of the second data being different,
said first selection multiplexer is to output one of a first byte of the first data and a first byte of the second data based at least in part on the received first data selection control indication, the received first data selection control indication based at least in part on the complemented third sign bit value; and
said second selection multiplexer is to output one of a second byte of the first data and a second byte of the second data based at least in part on the received second data selection control indication, the received second data selection control indication based at least in part on the complemented third sign bit value.

17. A method to perform a minimum/maximum operation on a plurality of data, the plurality of data including a first data and a second data, the method comprising:
preconditioning the first data and the second data of the plurality of data, said preconditioning including generating a complemented first data and a complemented second data;
selecting one data pair of a first data pair and a second data pair, the first data pair including the second data and the complemented first data, the second data pair including the complemented second data and the first data;
generating a carry indication based at least in part on adding together at least each of the data of the selected data pair; and
selecting one of the first data and the second data based at least in part on the carry indication.

18. The method of claim 17, wherein selecting one data pair of a first data pair and a second data pair includes receiving a first control indication and a second control indication.

19. The method of claim 17, further comprising outputting the selected one of the first data and the second data on a minimum/maximum output.

20. A method to perform a minimum/maximum operation on a plurality of data, the plurality of data including a first data and a second data, the method comprising:
preconditioning the first data and the second data of the plurality of data, said preconditioning including generating a complemented first data and a complemented second data, each of the data including a first portion and a second portion;
selecting one data pair of a first data pair and a second data pair, the first data pair including the second data and the complemented first data, the second data pair including the complemented second data and the first data;
generating a first carry indication based at least in part on adding together at least each of the first portions of each of the data of the selected data pair;
generating a signed data indication based on a comparison of the first sign bit value of the first data and a second sign bit value of the second data;
generating a first selection control indication and a second selection control indication based at least in part on a data size indication and the signed data indication;
outputting one of the first data portion of the first data and the first data portion of the second data based at least in part on the first data selection control indication; and
outputting one of the second data portion of the first data and the second data portion of the second data based at least in part on the second data selection control indication.

21. The method of claim 20, wherein:
the first sign bit value of the first data and the second sign bit value of the second data are the same;
the data size indication is a word indication; and
the first data selection control indication and the second data selection control indication being further based at least in part on the first carry indication.

22. The method of claim 20, further comprising:
generating a signed selector indication,
the first sign bit value of the first data and a second sign bit value of the second data being different,
the data size indication being a word indication, and
the first data selection control indication and the second data selection control indication being further based at least in part on the signed selector indication.

23. The method of claim 20, further comprising:
generating a second carry indication based at least in part on adding together at least each of the second portions of each of the data of the selected data pair,
the data size indication being a byte indication, and
the first data selection control indication being further based at least in part on the first carry indication,
the second data selection control indication being further based at least in part on the second carry indication.

* * * * *